United States Patent
Houghtaling et al.

(10) Patent No.: US 9,012,346 B2
(45) Date of Patent: *Apr. 21, 2015

(54) WET LAMINATION PROCESS FOR REDUCING MUD CRACKING IN FUEL CELL COMPONENTS

(75) Inventors: Bradley M. Houghtaling, Rochester, NY (US); Scott C. Moose, Victor, NY (US); Paul D. Nicotera, Honeoye Falls, NY (US); Robert R. Quiel, Penfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/939,421

(22) Filed: Nov. 4, 2010

(65) Prior Publication Data
US 2012/0111490 A1   May 10, 2012

(51) Int. Cl.
*H01M 4/88* (2006.01)
*H01M 4/92* (2006.01)
*H01M 8/10* (2006.01)

(52) U.S. Cl.
CPC .......... *H01M 4/8828* (2013.01); *H01M 4/8875* (2013.01); *H01M 4/8882* (2013.01); *H01M 4/925* (2013.01); *H01M 2008/1095* (2013.01); *Y02E 60/50* (2013.01)

(58) Field of Classification Search
CPC ............ H01M 4/8828; H01M 4/8875; H01M 4/8882; H01M 4/925; Y02E 60/50
USPC .......... 502/101; 429/483, 484, 485, 487, 492, 429/493, 494
See application file for complete search history.

(56) References Cited

U.S. PATENT DOCUMENTS

| | | | |
|---|---|---|---|
| 4,187,390 A | 2/1980 | Gore | |
| 4,849,253 A * | 7/1989 | Maricle et al. | 427/115 |
| 5,318,863 A | 6/1994 | Dhar | |
| 6,524,736 B1 * | 2/2003 | Sompalli et al. | 429/535 |
| 8,142,957 B2 * | 3/2012 | Zhang et al. | 429/535 |
| 2004/0214064 A1 | 10/2004 | Cavalca et al. | |
| 2005/0019649 A1 | 1/2005 | Kakutani et al. | |
| 2005/0164072 A1 | 7/2005 | Yan et al. | |
| 2005/0233067 A1 | 10/2005 | Gascoyne et al. | |
| 2006/0045985 A1 * | 3/2006 | Kozak | 427/458 |
| 2007/0087245 A1 | 4/2007 | Fuller et al. | |

(Continued)

FOREIGN PATENT DOCUMENTS

| | | |
|---|---|---|
| CN | 1108818 A | 9/1995 |
| CN | 1414652 A | 4/2003 |

(Continued)

OTHER PUBLICATIONS

Non-Final Office Action dated Aug. 1, 2012 pertaining to U.S. Appl. No. 13/005,587, filed Jan. 13, 2011.

(Continued)

*Primary Examiner* — Jun Li
(74) *Attorney, Agent, or Firm* — Dinsmore & Shohl LLP

(57) ABSTRACT

Methods of making a substantially crack-free electrode layer are described. The methods include depositing an electrode ink on a substrate; placing a solid polymer film on a surface of the wet electrode ink; drying the electrode ink; and removing the solid polymer film from the surface of the dry electrode ink to form the substantially crack-free electrode layer on the substrate.

19 Claims, 4 Drawing Sheets

(56) References Cited

U.S. PATENT DOCUMENTS

| | | |
|---|---|---|
| 2007/0213203 A1 | 9/2007 | Sompalli et al. |
| 2007/0227650 A1 | 10/2007 | Yan et al. |
| 2008/0143061 A1 | 6/2008 | Steinbach et al. |
| 2008/0251205 A1 | 10/2008 | Zhang et al. |
| 2009/0181276 A1 | 7/2009 | Beutel et al. |
| 2010/0009240 A1 | 1/2010 | Fly et al. |
| 2010/0043954 A1 | 2/2010 | Shimoda et al. |
| 2010/0129730 A1 | 5/2010 | Suzuki |

FOREIGN PATENT DOCUMENTS

| | | |
|---|---|---|
| CN | 1613162 A | 5/2005 |
| CN | 1669166 A | 9/2005 |
| CN | 1949568 A | 4/2007 |
| CN | 1949570 A | 4/2007 |
| CN | 1949574 A | 4/2007 |
| CN | 101212054 A | 7/2008 |
| CN | 101425583 A | 5/2009 |
| WO | 03100894 A2 | 12/2003 |
| WO | 2007014236 A2 | 2/2007 |
| WO | 2007119132 A1 | 10/2007 |

OTHER PUBLICATIONS

Final Office Action dated Nov. 23, 2012 pertaining to U.S. Appl. No. 13/005,587, filed Jan. 13, 2011.

Advisory Action dated Jan. 30, 2013 pertaining to U.S. Appl. No. 13/005,587, filed Jan. 13, 2011.

Non-Final Office Action dated Sep. 8, 2011 pertaining to U.S. Appl. No. 11/972,817, filed Jan. 11, 2008.

Final Office Action dated Mar. 19, 2012 pertaining to U.S. Appl. No. 11/972,817, filed Jan. 11, 2008.

Non-Final Office Action dated Jul. 11, 2013 pertaining to U.S. Appl. No. 11/972,817, filed Jan. 11, 2008 (after RCE).

* cited by examiner

WET LAMINATION PROCESS FOR REDUCING MUD CRACKING IN FUEL CELL COMPONENTS

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with electrode layers (e.g., containing at a minimum one catalyst type and one ionomer type) on both sides. The catalyst coated PEM is positioned between a pair of gas diffusion media layers, and a cathode plate and an anode plate are placed outside the gas diffusion media layers. The components are compressed to form the fuel cell.

The catalyst layers can be attached to the PEM forming a membrane electrode assembly (MEA) (also known as a catalyst coated membrane (CCM)). One method of forming an MEA involves depositing an electrode ink on the PEM by direct spraying or coating in a shim frame. Alternatively, the electrode can be formed on a decal and transferred to the PEM. Alternatively, the catalyst/ionomer ink can be coated on a gas diffusion medium (GDM) substrate, which is known as a catalyst coated diffusion media (CCDM).

Typically, the electrode ink includes powder catalyst on a support, such as a carbon support, and an ionomer solution which are dispersed in a mixed solvent. The mixed solvent usually contains one or more organic solvents, such as alcohols, and water in a specific ratio that depends on the type of catalyst. The mixture is then homogenized by ball-milling for up to about 3 days before coating on the PEM, decal substrate, or GDM. For shim coating, the catalyst loading can be controlled by the thickness of the shim; for the Mayer rod coating, the catalyst loading can be controlled by the thread number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously. The pressure and time for the hot press may vary for different types of MEAs.

It is known that electrodes made from catalyst ink are prone to forming a network of cracks on the surface, which is called "mud cracking." It is well known that stresses develop as a wet film dries and the solid materials begin to consolidate. Although not wishing to bound by theory, the cracks may form due to non-uniform drying of the catalyst ink during fabrication of the electrodes. The cracks may also form following drying due to an inherent weakness of the electrode. The electrode is formed from a porous matrix of the carbon support bound by the ionomer, which is a relatively weak binder. As a result, the matrix of the carbon support within the ionomer may not be continuous. In addition, the carbon support provides minimal reinforcement to the ionomer, and the resulting matrix may not withstand the substantial stresses during the drying of the catalyst ink, resulting in a greater opportunity for the cracks to form during operation of the fuel cell. If the tensile strength of the film is insufficient to overcome the induced drying stress, mud cracks can form to relieve the film of the stress.

The network of cracks can negatively impact the performance of the fuel cell in several ways. For example, during the typical expansion and contraction of the electrolyte membrane during fuel cell operation, the base of the cracks can form a stress concentration on the adjacent electrolyte membrane, which may result in degrading the membrane, for example, forming pin-holes. In addition, the electrolyte membrane immediately adjacent to the crack is exposed to a different humidity environment than the electrolyte membrane immediately adjacent to the electrode. The expansion of the electrolyte membrane into the cracks can also degrade the electrolyte membrane, particularly after repeated expansion and contraction cycles. Furthermore, the network of cracks in the electrode can reduce the effective stiffness of the electrode, resulting in an undesirable movement of the MEA during fuel cell operation.

A number of methods for reducing mud cracking have been developed. One method involves increasing the time allowed for the catalyst ink to dry. However, increasing the drying time also increases manufacturing costs and may not be sufficient to reduce cracking. Increasing the drying time also may not optimize the resistance to cracking of the electrode during subsequent operation of the fuel cell.

Therefore, there is a need for making an electrode which reduces mud cracking.

SUMMARY OF THE INVENTION

The present invention meets this need. One aspect of the invention is a method of fabricating a substantially crack-free electrode. In one embodiment, the method includes depositing an electrode ink on a substrate; placing a solid polymer film on a surface of the wet electrode ink; drying the electrode ink; and removing the solid polymer film from the surface of the dry electrode ink to form the substantially crack-free electrode layer on the substrate.

DETAILED DESCRIPTION OF THE INVENTION

Figure 1:
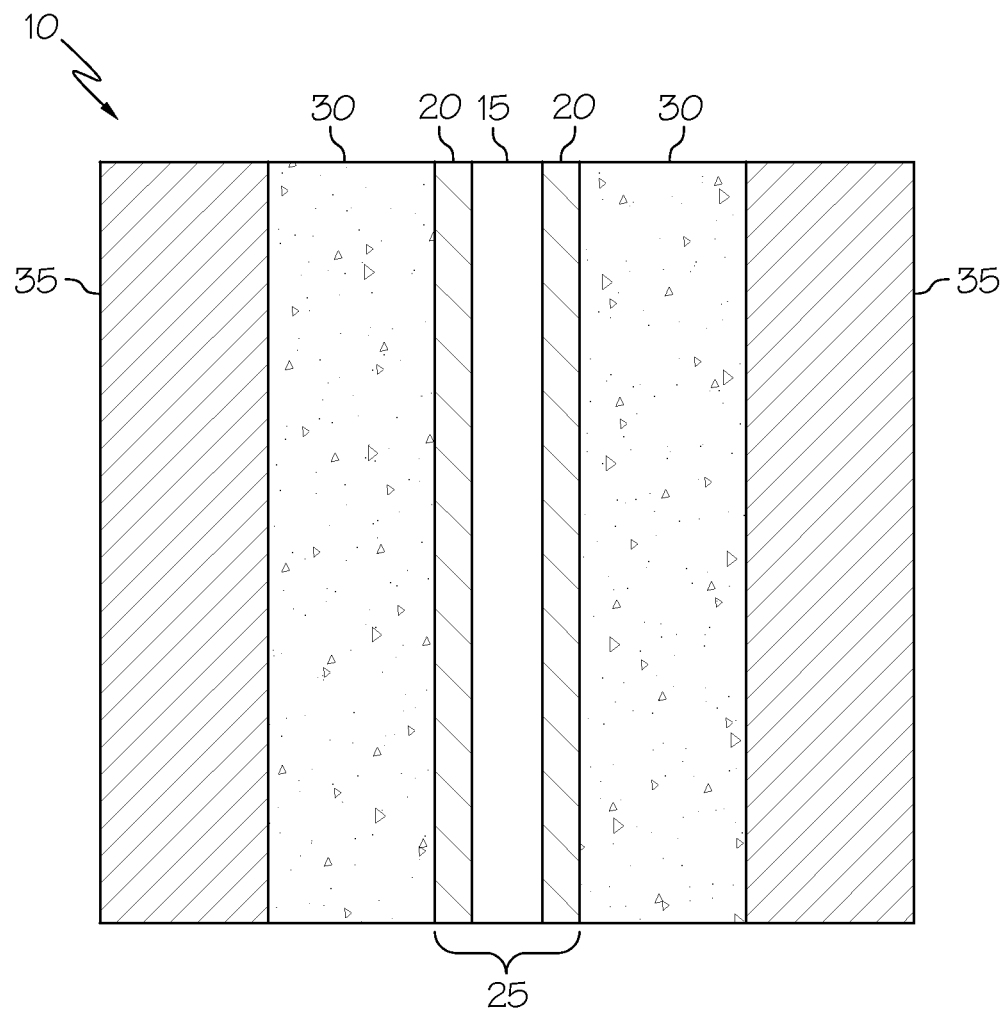
FIG. 1 is a schematic cross-section of one embodiment of a fuel cell.

FIG. 1 shows one embodiment of a fuel cell 10. The fuel cell includes a PEM 15 between a pair of electrodes 20. The electrodes 20 form a cathode and an anode for the fuel cell. The electrodes 20 may be deposited onto the PEM 15, as in the CCM design, to form an MEA 25. There is a GDM 30 adjacent to each of the electrodes 20. The electrodes 20 can be deposited onto the GDM, as in the CCDM design. Adjacent to each of the GDM is a fuel cell plate 35. These fuel cell plate can be unipolar or bipolar plates, as known in the art. The electrodes of the present invention can be used with any appropriate fuel cell components.

The electrode includes a matrix of ionomer having a plurality of electrically conductive support particles substantially evenly distributed throughout. The matrix of ionomer is formed from any suitable proton-conducting polymer that is substantially stable under the operating conditions and temperature associated with operation of the fuel cell. Suitable ionomer includes, but is not limited to, perfluorosulfonic acid (PFSA) polymer (for example Nafion® from the E.I, DuPont de Nemours and Co.), hydrocarbon ionomers such as sulfonated polyether ketones, aryl ketones, and polybenzimidazoles. Other proton-conducting polymers could also be used.

Electrically conductive support particles support the catalyst. In the typical situation, the catalyst is disposed on the conductive support particles, as opposed to the ionomer. The conductive support particles can be formed from any material having sufficiently high electrical conductivity and surface area to be used in a fuel cell. Suitable conductive support particles include, but are not limited to carbon black, graphite, and activated carbon.

The catalyst is typically a finely divided precious metal having catalytic activity. Suitable precious metals include, but are not limited to, platinum group metal, such as platinum, palladium, iridium, rhodium, ruthenium, and their alloys. The platinum group metal can be alloyed with other metals as well, if desired. Catalyst coated support materials are commercially available, as is known to those of skill in the art.

The method allows the fabrication of a substantially mud crack-free electrode layer having a uniform thickness. It has been found that placing a solid polymer film on the surface of a wet electrode, MPL layer, or other wet film construction while it is drying significantly reduces or eliminates mud cracking by reinforcing the surface of the film while the film's structure is being formed. The polymer film is removed after the wet electrode is dried. The polymer film can be removed by any suitable method, including, but not limited to, peeling the polymer layer off of the dried electrode layer. Any polymer film that has a sufficiently high surface energy to stick to the wet film surface and a low enough surface energy so that it can be easily peeled from the dried electrode can be used. Suitable polymers include, but are not limited to, polyethylene, polytetrafluoroethylene (PTFE), ethylene tetrafluoroethylene, and the like.

It has been shown that a substantially mud crack-free cathode can extend the life of an MEA by eliminating damage to the membrane. By "substantially crack-free," we mean that very few cracks are visible under reflected light microscopy. The number of mud cracks is desirably as close to zero as possible.

The catalyst-based inks typically contain solvent, ionomer, and catalyst, for example platinum. Suitable solvents include, but are not limited to, organic solvents and water. Suitable organic solvents include, but are not limited to, alcohols, ketones, and the like. Suitable alcohols include, but are not limited to, isopropyl alcohol, n-propyl alcohol, ethanol, butanol, diacetone alcohol, pentanol, or combinations thereof. Water is typically included in the mixture, although this is not required. The electrode ink can optionally include one or more additional materials to improve the electrode properties, if desired. For example, fibers or layered silicate reinforcements could be included, as described in U.S. application Ser. No. 12/170,706, filed Jul. 10, 2008, and U.S. application Ser. No. 12/882,653 filed Sep. 15, 2010, which are incorporated herein by reference.

The electrode ink can be deposited on any suitable substrate, including, but not limited to, a proton exchange membrane, a gas diffusion media (without a microporous layer), a gas diffusion media with a microporous layer, a free-standing microporous layer, or a decal substrate. It could also be deposited on an existing electrode layer on any of these types of substrates in order to form a multilayer electrode structure.

The ink is dried to remove the solvent. The polymer film remains attached until the drying stresses are below a threshold where cracking no longer occurs One way to determine this would be to measure the stress vs. residual solvent level. Another way would be to remove the polymer film at different times during the drying cycle, image the surface, and then finish drying. If after the final drying step, the surface is cracked, the film was removed too early. Thus, it can be inferred that the residual solvent level was too high at that point. It is not a condition for success that the dried film be bone dry when the polymer film is removed. There can be residual water and/or solvent content in the electrode layer when the polymer film is removed provided that when the film is been removed, there is a low enough stress level that cracks do not occur, as described above. Any drying process that efficiently dries the solvent (including the water if present) can be used. Suitable drying processes include, but are not limited to, infrared (IR) drying and convective drying.

Catalyst based inks were produced which contained solvent, water, ionomer, and platinum containing catalyst. Using conventional coating techniques, such as slot die coating, the ink was applied to the GDM. A solid polymer film, such as a polyethylene film, was placed on the wet ink. The ink was then dried under an IR lamp to remove the solvent(s), and the solid polyethylene layer was removed. The resulting cathode was combined with the counter electrode and membrane to form an MEA.

Example 1

Ink Preparation 2.89 g of a Pt-alloy catalyst was added to 400 g 5 mm zirconia milling beads. A premix of 65.4 g n-propyl alcohol, 20.1 g water, and 11.59 g of a perfluorosulfonic acid (PFSA) ionomer solution was added to the catalyst and milling media. The mixture was ball milled for 24 hrs.

Electrode Coating Preparation

The catalyst-containing ink was coated directly onto gas diffusion media (GDM) (with a microporous layer), and a 3 mil sheet of polyethylene (PE) film was placed on the wet film surface. The target Pt loading was 0.2 mg Pt/cm$^2$. The coating was dried under an infrared (IR) lamp for 10 min. at 400° F., and the PE film was peeled from the electrode surface forming a catalyst coated diffusion medium (CCDM). A thin film of ionomer was coated on the surface of the CCDM, with a target coating weight of 0.16 mg/cm$^2$. The coating was dried under an IR lamp for 4 min. at 400° F.

MEA Assembly 50 cm$^2$ pieces of the CCDM made above were used for the cathode. 50 cm$^2$ pieces of a CCDM having 0.05 mg Pt/cm$^2$ were used for the anode. A PFSA membrane was placed between the cathode and anode CCDM. The assembly was hot pressed at 295° F. under a force of 4000 lb for 2 min.

Figure 2:
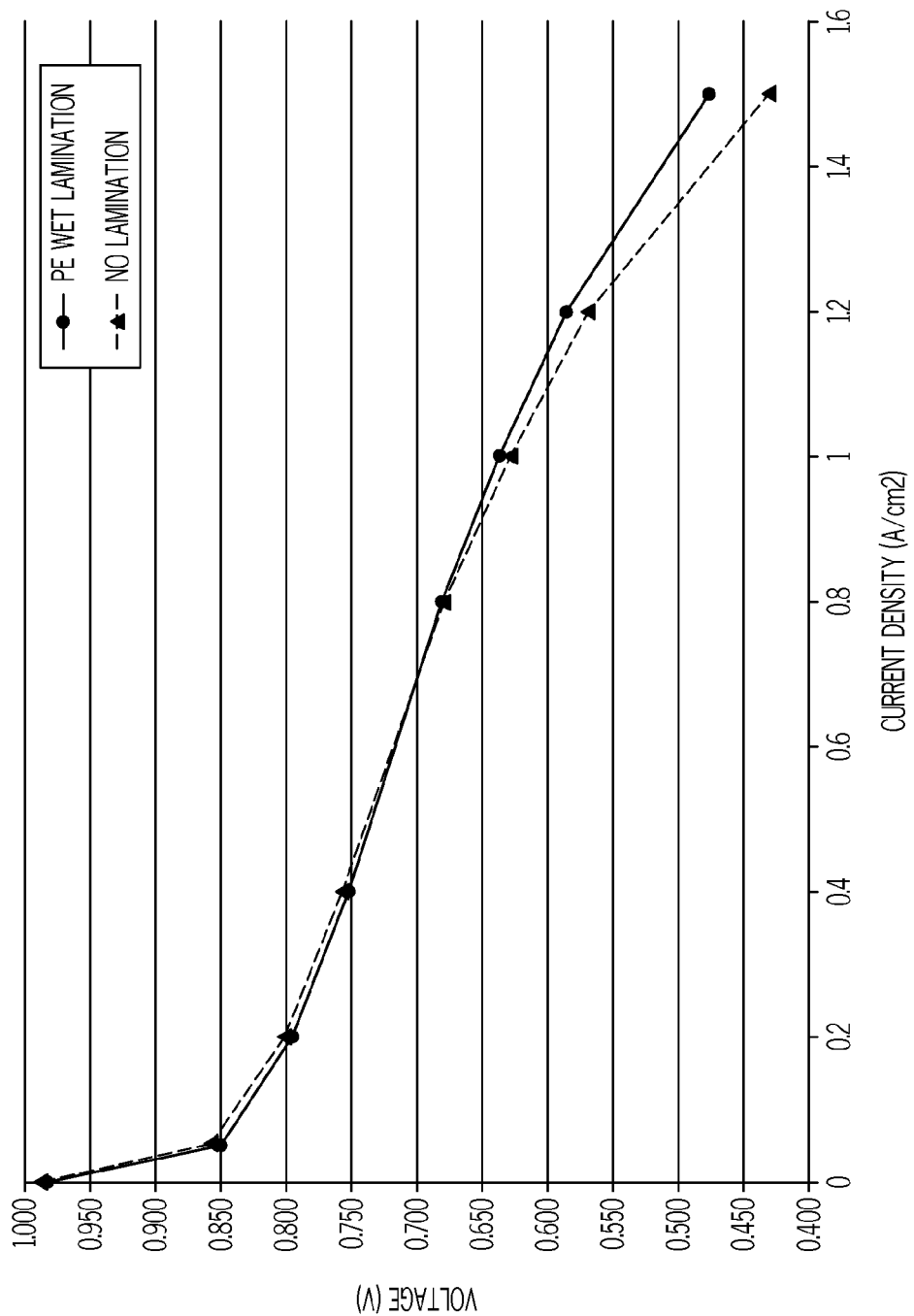
FIG. 2 is a graph showing the voltage as a function of current density for a non-laminated electrode and a wet laminated electrode.
Figure 3:
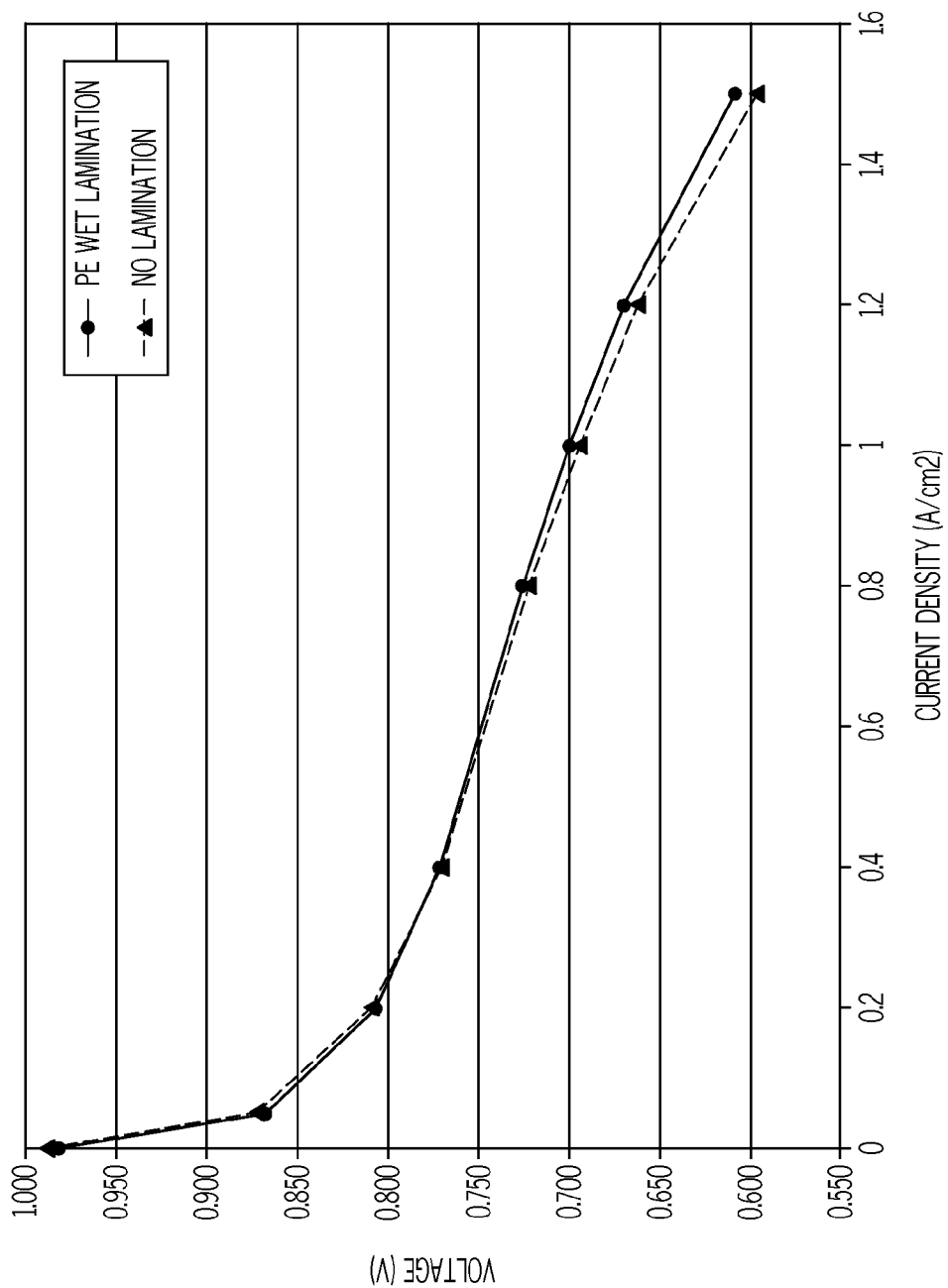
FIG. 3 is a graph showing the voltage as a function of current density for a non-laminated electrode and a wet laminated electrode.
Figure 5:
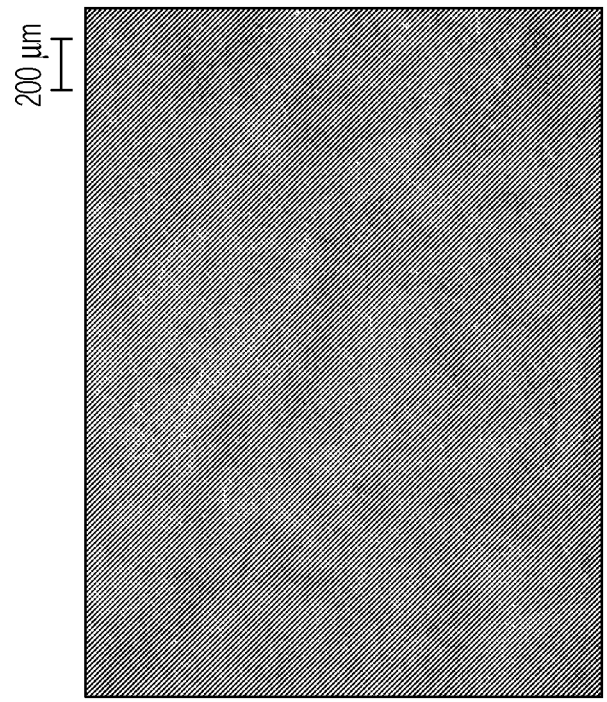
FIG. 5 is an optical image of a wet laminated electrode.
Figure 4:
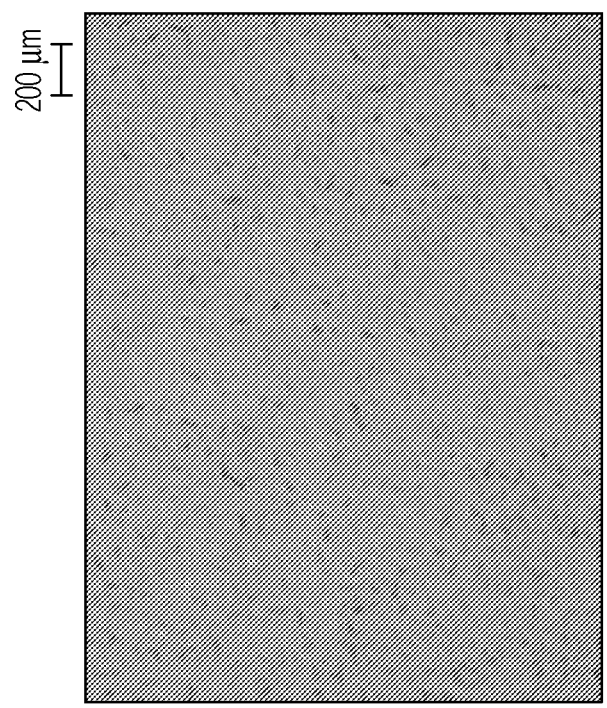
FIG. 4 is an optical image of a non-laminated electrode.

The MEAs were then tested in situ with a 50 cm$^2$ active area under very low humidification (95° C., 26% RH, 150 kPa absolute) as well as moderately humidified conditions (80° C., 32% RH, 150 kPa absolute), as shown in FIGS. 2-3. As can be seen in both polarization curves, the performance is improved as compared to the reference. As shown in FIG. 4-5, the non-laminated electrode shows obvious mud cracking, while the wet laminated electrode image shows no cracking.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of fabricating a substantially crack-free electrode, the method comprising:
    depositing an electrode ink on a substrate such that direct contact is established there between;
    placing a solid polymer film on a surface of the wet electrode ink;
    drying the electrode ink with the solid polymer film thereon; and
    removing the solid polymer film from the surface of the dry electrode ink to form the substantially crack-free electrode layer on the substrate; and
    wherein the substrate is selected from the group consisting of a proton exchange membrane, a gas diffusion media without a microporous layer, and a gas diffusion media with a microporous layer, wherein the substrate remains as a part of the crack-free electrode.

2. The method of claim 1 wherein the solid polymer film is polyethylene, polytetrafluoroethylene, ethylene tetrafluoroethylene, or combinations thereof.

3. The method of claim 1 wherein the electrode ink comprises a solvent, an ionomer, and a catalyst.

4. The method of claim 3 wherein the solvent comprises an organic solvent, water, or combinations thereof.

5. The method of claim 4 wherein the organic solvent is isopropyl alcohol, n-propyl alcohol, ethanol, butanol, diacetone alcohol, pentanol, or combinations thereof.

6. The method of claim 4 wherein the ionomer is perfluorosulfonic acid polymer, sulfonated polyether ketone, aryl ketone, or polybenizimidazole.

7. The method of claim 4 wherein the catalyst is a platinum group metal.

8. The method of claim 4 wherein the catalyst is disposed on electrically conductive support particles.

9. The method of claim 1 wherein removing the solid polymer film from the surface of the dry electrode ink comprises peeling the solid polymer film from the surface of the dry electrode ink.

10. The method of claim 1 wherein drying the electrode ink comprises exposing the electrode ink to an infrared lamp to remove a solvent in the electrode ink.

11. The method of claim 1 wherein drying the electrode ink comprises convectively heating the electrode ink.

12. The method of claim 1 wherein the substrate has an initial electrode layer thereon.

13. The method of claim 12 wherein the initial electrode layer is made by:
    depositing an initial electrode ink on the substrate;
    placing an initial solid polymer film on a surface of the wet initial electrode ink;
    drying the initial electrode ink with the initial solid polymer film thereon; and
    removing the initial solid polymer film from the surface of the dry initial electrode ink to form a substantially crack-free initial electrode layer on the substrate.

14. The method of claim 13 wherein the initial solid polymer film is polyethylene, polytetrafluoroethylene, ethylene tetrafluoroethylene, or combinations thereof.

15. The method of claim 13 wherein the initial electrode ink comprises a solvent, an ionomer, and a catalyst.

16. The method of claim 15 wherein the ionomer is perfluorosulfonic acid polymer, sulfonated polyether ketone, aryl ketone, or polybenizimidazole.

17. The method of claim 13 wherein removing the initial solid polymer film from the dry initial electrode ink comprises peeling the initial solid polymer film from the surface of the dry initial electrode ink.

18. The method of claim 13 wherein drying the initial electrode ink comprises exposing the initial electrode ink to an infrared lamp to remove a solvent in the initial electrode ink.

19. A method of fabricating a proton exchange membrane fuel cell, the method comprising:
    providing a substrate that forms a part of the fuel cell;
    depositing an electrode ink on the substrate such that direct contact is established there between;
    placing a solid polymer film on a surface of the wet electrode ink;
    drying the electrode ink with the solid polymer film thereon; and
    removing the solid polymer film from the surface of the dry electrode ink to form a substantially crack-free electrode layer on the substrate; and
    placing a fuel cell plate in fluid cooperation with the electrode layer and the substrate, wherein the substrate is selected from the group consisting of a proton exchange membrane, a gas diffusion media without microporous layer, and a gas diffusion media with a microporous layer.

* * * * *